Nov. 1, 1932.  F. A. EICHORN  1,885,696

COMBINED PACKING AND EXPANSION RING

Filed Jan. 8, 1931

WITNESSES
B. W. Friedel.

Fred Anthony Eichorn INVENTOR

BY

ATTORNEY

Patented Nov. 1, 1932

1,885,696

UNITED STATES PATENT OFFICE

FRED ANTHONY EICHORN, OF CHATTANOOGA, TENNESSEE

COMBINED PACKING AND EXPANSION RING

Application filed January 8, 1931. Serial No. 507,412.

This invention relates to improvements in packing assemblages for pistons, and its objects are as follows:—

First, to provide a steel or other resilient expansion ring as a backing for a ring of packing material, one of the purposes of the expansion ring being to keep the sections or pieces of the packing ring pressed against the walls of the cylinder in the event of breakage of the packing ring.

Second, to provide a spring-pressed wedge-shaped device for the purpose of acting simultaneously on the appropriately shaped ends of a split packing ring and a split expansion ring which backs the latter, in order to force both rings outwardly with equal pressure thereby not only to insure a determined degree of pressure of the packing ring against the cylinder wall, but also a firm contact of the expansion ring with the packing ring.

Third, to provide a special type of spring to be used in conjunction with the foregoing wedge-shaped device when said device and the combined rings are employed in the pistons of some engines where there is an insufficient piston thickness to enable the formation of an opening deep enough for the operation of the wedge with a spiral or other type of spring.

Figure 1:
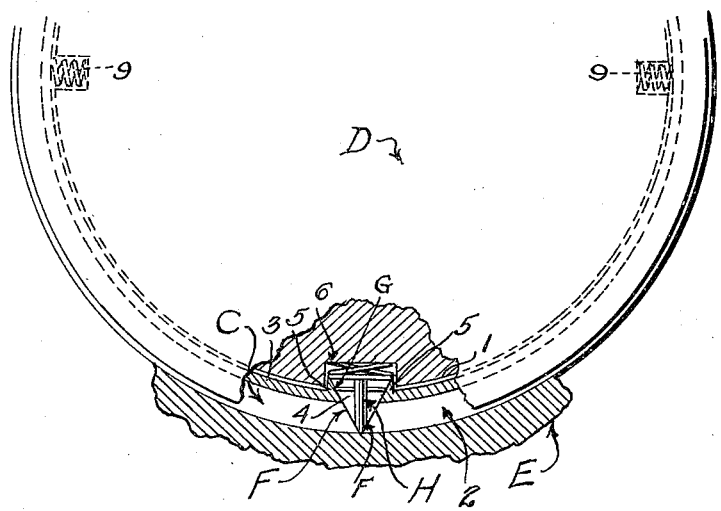
Figure 2:
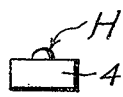
Figure 3:
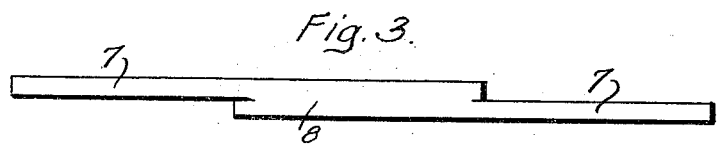
Figure 4:

Other objects and advantages will appear in the following specification, reference being had to the accompanying drawing in which Figure 1 is a partial plan view of a piston having a fraction thereof, as well as of the cylinder in which the piston, works, shown in section to reveal the improved piston ring assemblage, Figure 2 is an elevation of the wedge-shaped device illustrated in Figure 1, particularly showing the guide rib, Figure 3 is a plan view of a spring blank, Figure 4 is an elevation of the blank bent into spring form.

In carrying out the foregoing objects of the invention, one of the important purposes in mind is to provide a non-leakable, self-adjusting packing ring with an expanding ring bearing tightly against the inside of the packing ring to hold it against the wall of the cylinder. This tight bearing of the expanding ring has the important purpose, touched upon above, of compelling the packing ring to function even though the latter has broken into two or more pieces or sections.

A piston D which may be regarded as that of the cylinder E of any steam, gas or other fluid pressure engine, has one or more grooves 1 for the reception of a piston ring assemblage generally denoted 2. This assemblage comprises a packing ring C and expansion ring 3. The expansion ring 3 is made of steel or other expansible material, and is located inside of the packing ring C in order to press outwardly in the manner previously brought out.

One of the purposes of having the expansion ring 3 bear tightly against the inside of the packing ring C is to hold the sections or pieces of packing ring against the wall of the cylinder in the event of breakage of the packing ring. There are occurrences when a packing ring will break. At such a time there is the likelihood of some of the broken pieces dropping down in the groove 1. One piece will thus be offset from another and thus give rise to the possibility of pressure fluid escaping past the ring.

By backing the packing ring C with an expansible ring of steel or the like, there will always be an inherent outward pressure, not only insuring the keeping of the packing ring in engagement with the wall of the cylinder while in contact but also insuring keeping the fragments of the packing ring in such contact in case of a breakage as previously pointed out.

A wedge-shaped device 4 augments the function of the expansion ring 3. This device acts on the rings 3, C simultaneously. The rings 3 and C are naturally split to provide access for the wedge-shaped device 4, the ends of the two rings being bevelled to agree with the slot of the size of the wedge-shaped device as plainly shown in Figure 1.

The bevelled ends of the packing ring C are denoted F. The corresponding bevelled ends of the expansion ring 3 are denoted G. It is to be observed that the confronting ends of the rings 3 are slightly upset or enlarged as at 5 so as to enable extending the bevelled surfaces G over a slightly greater area and insure a more ample contact of the wedge device 4.

The bevelled surfaces assume an angle of approximately 45°. The showing in Figure 1 is that of a slightly lesser angle, but in practice the angle may be as shown in Figure 1, or it may be 45°, or more or less, in any event to provide a tapering wedge which will work against the expansion ring 3 so that this will be forced out against the packing ring 3, and the latter, in turn will be expanded against the wall of the cylinder.

A rib H, running lengthwise of the wedge-device 4 and extending radially of the piston D, serves as a guide to keep the wedge device from turning sidewise in reference to the pair of rings. This guide rib may be of any desired cross sectional shape, the particular illustration in Figure 2 being that of a half-round rib. In order that the foregoing function of the rib may be carried out the rib will be fitted in a half circular groove in one edge of the ring groove 1, said half circular groove facing the pressure side of the piston D. The engagement of the guide rib H with the half circular groove will compel the wedge device 4 to work in the radial direction of the piston.

The wedge device 4 is intended to be long enough to extend above the end of the expanding ring 3, that is to say, the wedge device is long enough in the radial direction so that its base will extend inwardly beyond the ring 3. According to the showing in Figure 1 the base of the wedge device is substantially flush with the enlargements 5 but these obviously extend inwardly beyond the ring itself.

There is a purpose in this provision. As the packing ring C wears it is necessary that the wedge device should still be long enough in order to maintain its spreading function on the expansion ring 3 even though the packing ring C be worn completely out.

Under ordinary circumstances the usual type of spring may be employed to exercise an outward pressure on the wedge device 4. In case there is sufficient piston thickness to enable forming a slot or opening deep enough, use may be made of a spiral spring. But in certain classes of engines which have pistons of the type where there is not room enough to drill the opening or slot 6 to a sufficient depth the bent type of spring in Figure 4 will be employed.

In its original blank form (Fig. 3) this spring comprises a length of resilient metal having extremities 7 which are narrow relatively to the medial body 8. These extremities are offset in respect to each other, that is to say, the extremities are continuations in opposite directions of the opposite sides of the body 8, the inner edges of the extremities being in line with each other as plainly shown in Figure 3.

When the extremities 7 are bent into the final spring form (Fig. 4), they are enabled to cross each other by virtue of the foregoing shape of the blank. When this spring is placed in the opening 6 (Fig. 1) the body 8 will rest against the base of the wedge device 4 while the tips of the extremities 7 will bear against the bottom of the opening.

A perfectly equalized outward pressure on the wedge device 4 is the result of the specific spring. This equalization of pressure will obtain whether the extremities 7 are extended far from the body 8 or are pressed relatively close. The chief advantage of this form of spring is that it will operate efficiently in very close quarters.

Reverting to the wedge device 4, the purpose of cutting the ends F and G of the rings C and 3 at angles to agree with the sides of the wedge device is to insure a steam tight joint. If the abutting ends of the rings were otherwise there would be the likelihood of steam or other pressure fluid leakage. There is an indicator line across the face of the wedge to show when the packing C is worn enough to be renewed.

It is desired to say that the wedge device 4 may be used alone without either the spring 7, 8 or the expansion ring.

What I claim is:—

1. A packing assemblage comprising a transversely split ring of packing material to be seated in a piston groove, a transversely split expansion ring located inside of the packing ring to keep the latter pressed against the wall of a cylinder both while the packing ring remains intact and in the event of its breakage into sections, and separating means acting simultaneously against the confronting ends of the split rings, augmenting the expansive function of the expanding ring and assisting in keeping the packing ring pressed against said wall.

2. A packing assemblage comprising a transversely split ring of packing material to be seated in a piston groove, a transversely split expansion ring located inside of the packing ring to keep the latter pressed against the wall of a cylinder both while the packing ring remains intact and in the event of its breakage into sections, separating means acting simultaneously against the confronting ends of the split rings, augmenting the expansive function of the expanding ring and assisting in keeping the packing ring pressed against said wall, and means for guiding said separating means in reference to the piston groove to prevent its turning out of position in relationship to said rings.

3. A packing assemblage comprising a ring of packing material to be fitted in a piston groove, an expansion ring in the groove behind the packing ring to press the latter outwardly into contact with a cylinder wall, said rings being split and having the confronting ends provided with matching bevels so as to form opposing, continuous bevelled surfaces, a wedge device fitting against said surfaces, and resilient means pressing against the wedge device thereby simultaneously separating the rings and augmenting the expansive function of said expansion ring.

4. A packing assemblage comprising a ring of packing material to be fitted in a piston groove, an expansion ring in the groove behind the packing ring to press the latter outwardly into contact with a cylinder wall, said rings being split and having the confronting ends provided with matching bevels so as to form opposing, continuous bevelled surfaces, a wedge device fitting against said surfaces, resilient means pressing against the wedge device thereby simultaneously separating the rings and augmenting the expansive function of said expansion ring, and guide means to guide the movement of the wedge device under the influence of said resilient means and thereby prevent said wedge device from turning in reference to the piston groove and rings.

5. A packing assemblage comprising a ring of packing material to be seated in a piston groove said ring being split and having the confronting ends oppositely bevelled, an expansion ring in the groove behind the packing ring, also being split and having the confronting ends provided with oppositely bevelled enlargements, which bevels are in continuation of the bevels of the packing ring ends, a wedge device having sides matching said continuous bevels, and resilient means between the base of the wedge device and the piston, pressing against the rings and thereby augmenting the expansive function of the expansion ring.

6. A packing assemblage comprising a transversely split packing ring to be inserted in the groove of a piston, a wedge device to act upon the confronting ends of said ring to cause a separation, and resilient means to act on the wedge device comprising a body portion to lie against the base of the wedge device and a bent extremity extending from said body portion to a point of engagement with the piston.

7. A packing assemblage comprising a transversely split packing ring to be inserted in the groove of a piston, a wedge device to act on the confronting ends of said ring to cause a separation, and resilient means to expand the wedge device, consisting of a body portion and crossed extremities to exercise an expansion action between the wedge device and the piston.

FRED ANTHONY EICHORN.